United States Patent
Brown et al.

(10) Patent No.: US 7,103,172 B2
(45) Date of Patent: Sep. 5, 2006

(54) MANAGING CALLER PROFILES ACROSS MULTIPLE HOLD QUEUES ACCORDING TO AUTHENTICATED CALLER IDENTIFIERS

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 10/015,380

(22) Filed: Dec. 12, 2001

(65) Prior Publication Data

US 2003/0108162 A1    Jun. 12, 2003

(51) Int. Cl.
H04N 3/00    (2006.01)

(52) U.S. Cl. ............... 379/266.01; 379/76; 379/88.02

(58) Field of Classification Search ............ 379/88.01, 379/88.02, 88.03, 88.04, 88.11, 88.12, 88.16, 379/88.17, 88.18, 265.01, 265.02, 265.09, 379/166.01, 76, 266.01
See application file for complete search history.

(56) References Cited

U.S. PATENT DOCUMENTS

| | | | | |
|---|---|---|---|---|
| 4,953,204 A | 8/1990 | Cuschleg et al. | ...... | 379/266.05 |
| 5,164,983 A | 11/1992 | Brown et al. | ......... | 379/265.03 |
| 5,499,288 A | 3/1996 | Hunt et al. | ................ | 379/88 |
| 5,533,115 A * | 7/1996 | Hollenbach et al. | ... | 379/221.11 |
| 5,590,188 A | 12/1996 | Crockett | ............. | 379/225 |
| 5,646,988 A | 7/1997 | Hikawa | ............. | 379/266.01 |
| 5,673,404 A | 9/1997 | Cousins et al. | ......... | 395/347 |
| 5,694,459 A * | 12/1997 | Backaus et al. | ....... | 379/127.01 |
| 5,790,637 A | 8/1998 | Johnson et al. | ........... | 379/67 |
| 5,806,045 A | 9/1998 | Biorge et al. | ............ | 705/14 |
| 5,864,872 A | 1/1999 | Lee et al. | ............. | 711/115 |
| 5,915,001 A | 6/1999 | Uppaluru | ............. | 379/88.22 |
| 5,933,828 A | 8/1999 | Eitel et al. | ............. | 707/10 |
| 5,937,044 A | 8/1999 | Kim | | |
| 5,940,476 A | 8/1999 | Morganstein et al. | .... | 379/88.02 |
| 5,946,378 A | 8/1999 | Farfan | ............. | 379/88.23 |

(Continued)

FOREIGN PATENT DOCUMENTS

EP    0585004 A2    3/1994

(Continued)

OTHER PUBLICATIONS

WPAT Derwent 1994-067503.

(Continued)

*Primary Examiner*—Fan Tsang
*Assistant Examiner*—Md. Shafiul Alam Elahee
(74) *Attorney, Agent, or Firm*—Mark S. Walker; Amy J. Pattillo

(57) ABSTRACT

A method, system, and program for managing caller profiles across multiple hold queues according to authenticated caller identifiers are provided. An identity of a caller of a call received at an on hold system is authenticated. The call is then placed in a hold queue. A caller profile associated with the identity of the caller is retrieved, such that services available to the caller while on hold are specified according to the caller profile. In particular, the caller profile is preferably retrieved from at least one caller profile server according to the caller identifier, where the at least one caller profile server is accessible to multiple on hold systems. Further, the identity of a caller may be authenticated by authenticating a voice sample received from the caller, such that a single identity for the caller may be authenticated at multiple call centers.

16 Claims, 9 Drawing Sheets

U.S. PATENT DOCUMENTS

| | | | |
|---|---|---|---|
| 5,946,386 A * | 8/1999 | Rogers et al. | 379/265.09 |
| 5,946,654 A | 8/1999 | Newman et al. | 704/246 |
| 5,978,467 A | 11/1999 | Walker et al. | 379/266.01 |
| 6,028,917 A | 2/2000 | Creamer et al. | 379/100.01 |
| 6,038,305 A | 3/2000 | McAllister et al. | 379/207 |
| 6,058,364 A | 5/2000 | Goldberg et al. | 704/252 |
| 6,064,730 A | 5/2000 | Ginsberg | 379/265.09 |
| 6,088,435 A | 7/2000 | Barber et al. | 379/205.01 |
| 6,101,242 A | 8/2000 | McAllister et al. | 379/88.02 |
| 6,122,357 A | 9/2000 | Farris et al. | 379/207 |
| 6,125,178 A | 9/2000 | Walker et al. | 379/211.01 |
| 6,157,655 A | 12/2000 | Shtivelman | 370/412 |
| 6,178,230 B1 | 1/2001 | Borland | 379/67.1 |
| 6,178,240 B1 | 1/2001 | Walker et al. | 379/266.01 |
| 6,246,759 B1 * | 6/2001 | Greene et al. | 379/265.02 |
| 6,263,051 B1 | 7/2001 | Saylor et al. | 379/88.17 |
| 6,324,276 B1 | 11/2001 | Uppaluru et al. | 379/220.01 |
| 6,327,346 B1 | 12/2001 | Infosino | 379/88.02 |
| 6,381,329 B1 * | 4/2002 | Uppaluru et al. | 379/266.04 |
| 6,400,804 B1 * | 6/2002 | Bilder | 379/76 |
| 6,424,709 B1 | 7/2002 | Doyle et al. | 379/265.02 |
| 6,487,291 B1 | 11/2002 | Walker et al. | 379/266.02 |
| 6,519,570 B1 | 2/2003 | Faber et al. | 705/8 |
| 6,522,743 B1 * | 2/2003 | Hurd | 379/266.04 |
| 6,529,585 B1 * | 3/2003 | Ng et al. | 379/88.03 |
| 6,535,492 B1 | 3/2003 | Shtivelman | 370/270 |
| 6,639,982 B1 | 10/2003 | Stuart et al. | 379/266.03 |
| 6,826,173 B1 | 11/2004 | Kung et al. | |
| 6,826,276 B1 * | 11/2004 | Brown et al. | 379/265.02 |
| 6,842,767 B1 * | 1/2005 | Partovi et al. | 709/203 |
| 6,845,155 B1 * | 1/2005 | Elsey | 379/266.04 |
| 2002/0141561 A1 | 10/2002 | Duncan et al. | 379/220.01 |
| 2003/0103617 A1 | 6/2003 | Brown et al. | 379/265.02 |
| 2003/0108184 A1 | 6/2003 | Brown et al. | 379/265.09 |
| 2003/0108185 A1 | 6/2003 | Brown et al. | 379/266.01 |
| 2003/0108186 A1 | 6/2003 | Brown et al. | 379/266.01 |
| 2003/0108187 A1 | 6/2003 | Brown et al. | 379/266.06 |
| 2004/0029567 A1 | 2/2004 | Timmins et al. | 455/412.1 |

FOREIGN PATENT DOCUMENTS

| | | | |
|---|---|---|---|
| EP | 0676882 | A2 | 10/1995 |
| JP | 8139797 | A | 5/1996 |
| JP | 10294784 | A | 11/1998 |

OTHER PUBLICATIONS

WPAT Derwent 1995-346415.
WPAT Derwent 1996-315499.
WPAT Derwent 1999-031530.

* cited by examiner

| CALLER PROFILE | — 70 |
|---|---|

VID - JANE SMITH 500-00-000
MUSIC PREFERENCE : CLASSICAL, LIGHT ROCK
NEWS PREFERENCE : HEADLINE NEWS
GAME PREFERENCE : GROUP, TRIVIA
AGE : 30
SEX : F
EDUCATION : COLLEGE
OCCUPATION : ADVERTISING
SPECIAL NEED : NONE
GEOGRAPHICAL REGION : 12
PRODUCTS:
    COMPUTER A; APPLIANCE B; CABLE SERVICE C
MONTHLY WAIT HISTORY :
    30 MINS CLASSICAL MUSIC, SONGS A-G
    20 MINS HEADLINE NEWS, CNN
    40 MINS TRIVIA GAME, QUESTIONS 1-40 FROM GAMES R US
    50 MINS SURVEY, POLITICAL VIEWS ON SPORTS
    5 MINS LIGHT ROCK MUSIC
    10 MINS SPORTS NEWS
CURRENT WAIT HISTORY
    20 MINS QUEUE 1    -> TRANSFER TO QUEUE 3 - QUEUE 1 WRONG
    2 MINS QUEUE 3    CURRENTLY ON HOLD
MONTHLY TIME WITH REPRESENTATIVE
    AVERAGE TIME : 10 MINUTES
    LONGEST TIME: 30 MINUTES
    SHORTEST TIME: 2 MINUTES
ON HOLD PTS = 20

VID - JON DOE 600-00-000
MUSIC PREFERENCE : JAZZ
NEWS PREFERENCE : ENTERTAINMENT NEWS
GAME PREFERENCE : CARD GAMES
AGE : 40
SEX : M
EDUCATION : GRADUATE
OCCUPATION : LEGAL
SPECIAL NEED : PARTIALLY DEAF
GEOGRAPHICAL REGION : 10
PRODUCTS:
    BLOCKED BY CALLER
MONTHLY WAIT HISTORY :
    10 MINS ENTERTAINMENT NEWS, ET
    20 MINS JAZZ, SONGS A-C
    40 MINS JAZZ, SONGS D-G
    5 MINS JAZZ, SONG H
    40 MINS 3RD PARTY CALL
    10 MINS 3RD PARTY CALL
CURRENT WAIT HISTORY
    10 MINS QUEUE 2    -> TRANSFER TO QUEUE 4 FOR ADDITIONAL QUESTION
    5 MINS QUEUE 4    CURRENTLY ON HOLD
MONTHLY TIME WITH REPRESENTATIVE
    AVERAGE TIME : 5 MINUTES
    LONGEST TIME: 20 MINUTES
    SHORTEST TIME: 1 MINUTES
ON HOLD PTS = 20

FIG. 5

HOLD QUEUE INFORMATION - QUEUE #1 - HARDWARE ISSUES — 72

| CALLER | POSITION | HOLD TIME | TIME WITH REPRESENTATIVE | REPRESENTATIVE |
|---|---|---|---|---|
| 512-33-000 | * | 60 MINS | 2 MINS | JOE DUCK |
| 411-00-111 | * | 50 MINS | 20 MINS | JAME DUCK |
| 311-00-111 | * | 45 MINS | 5 MINS | TOM DUCK |
| 333-00-111 | * | 44 MINS | 1 MIN | JOHN DUCK |
| 222-00-111 | 1 | 30 MINS | 0 MINS | |
| 222-00-222 | 2 | 29 MINS | 0 MINS | |
| 222-00-333 | 25 | 3 MINS | 0 MINS | |

VID 512-33-000 TRANSFERRED TO QUEUE #2 BECAUSE QUEUE #1 WRONG QUEUE FOR QUESTION ON HOLD POINTS = 30 = .5 (FOR WRONG QUEUE) * 60 MINS

HOLD QUEUE INFORMATION - QUEUE #2 - SOFTWARE ISSUES — 74

| CALLER | POSITION | CALL DURATION | TIME WITH REPRESENTATIVE | REPRESENTATIVE |
|---|---|---|---|---|
| 111-00-111 | * | 40 MINS | 5 MINS | BLUE DUCK |
| 222-00-111 | * | 35 MINS | 4 MINS | RED DUCK |
| 666-00-111 | 1 | 20 MINS | * | * |
| 777-00-111 | 2 | 18 MINS | * | * |
| 512-33-000 | 3 | 0 MINS | * | * |

75

VID 512-33-000 WITH POINTS APPLIED TO QUEUE #2

HOLD QUEUE INFORMATION - QUEUE #2 - SOFTWARE ISSUES — 76

| CALLER | POSITION | CALL DURATION | TIME WITH REPRESENTATIVE | REPRESENTATIVE |
|---|---|---|---|---|
| 111-00-111 | * | 45 MINS | 10 MINS | BLUE DUCK |
| 222-00-111 | * | 40 MINS | 9 MINS | RED DUCK |
| 512-33-000 | 1 | 5 MINS | * | * |
| 666-00-111 | 2 | 25 MINS | * | * |
| 777-00-111 | 3 | 23 MINS | * | * |

FIG. 6

MANAGING CALLER PROFILES ACROSS MULTIPLE HOLD QUEUES ACCORDING TO AUTHENTICATED CALLER IDENTIFIERS

CROSS-REFERENCE TO RELATED APPLICATIONS

The present application is related to the following co-pending applications:
(1) U.S. patent application Ser. No. 10/015,266 filed on Dec. 12, 2001.
(2) U.S. patent application Ser. No. 10/015,264 filed on Dec. 12, 2001.
(3) U.S. patent application Ser. No. 10/015,382 filed on Dec. 12, 2001.
(4) U.S. patent application Ser. No. 10/015,383 filed on Dec. 12, 2001.
(5) U.S. patent application Ser. No. 10/005,733 filed on Dec. 12, 2001.

BACKGROUND OF THE INVENTION

1. Technical Field

The present invention relates in general to telecommunications and, in particular, to call hold centers. Still more particularly, the present invention relates to managing caller hold times across multiple hold queues according to authenticated caller identifiers.

2. Description of the Related Art

Many companies provide telephone-based access to help staff, sales personnel, representatives, and automated menus via a call center. Where high telephone call traffic is typical in telephone access to a company's representatives, a PBX system receives the call and distributes the call to an automatic call distributor (ACD), thus incorporating a hold function in the call center. ACDs are often employed to provide an even and systematic distribution of incoming calls to multiple representatives. In particular, ACDs typically provide incoming calls with a direct connection to an available representative until all representatives are busy. Then, calling parties are placed in a call queue, and selectively connected to a representative once a representative comes available.

Call queues may cause frustration and ill will of consumers towards a company, particularly where excessively long waits, full queues and accidental disconnects are encountered. One way to alleviate some of the frustration associated with call queues is by specifying services and information provided to the caller while a caller waits in a call queue. For example, automated messages output to a caller, while the caller is on hold in a call hold queue, may be specified according to the products owned by a caller, the caller's expertise and messages that have been previously played to the caller while on hold.

However, call systems are limited in that each individual call center stores an individual profile for specifying services, requiring a caller to enter a new profile at each call center; requiring a new profile entry at each call center is time consuming and cancels the advantages of specified output. In addition, a caller may only call an individual call center one time, store a profile with the individual call center, and never call the individual call center again to take advantage of the logged profile, thus wasting resources and time.

A further disadvantage of current hold queue systems is that where multiple queues are selectable within a hold queue system, the caller may not always select the proper queue or may need to access multiple representatives where accessing each of the representatives requires waiting in a separate queue within a single call. In such cases, the caller will wait in a first queue to speak to a first representative, only to find out that the caller must wait in an additional queue to speak to a second representative.

Therefore, in view of the foregoing, it would be advantageous to provide a method, system, and program for storing and managing caller profiles including hold times within a call center at a single remote caller profile server that distributes the caller profiles to multiple call centers and multiple hold queues within a single or multiple call centers. In addition, in view of the foregoing, it would be advantageous to preserve a caller's current time investment in a call center in order to adjust a caller's position in each hold queue in that call center and across multiple call centers dependent upon previous hold queue times.

SUMMARY OF THE INVENTION

In view of the foregoing, it is therefore an object of the present invention to provide an improved telecommunications system.

It is another object of the present invention to provide a method, system and program for improved call hold queues.

It is yet another object of the present invention to provide a method, system and program for managing caller hold times across multiple hold queues according to authenticated caller identifiers.

According to one aspect of the present invention, a request is received at a caller profile server accessible in a telecommunications network for a caller profile according to an authenticated identifier of a caller currently on hold within a hold queue of a call center. The caller profile is distributed to the call center according to the authenticated identifier, wherein the caller profile is accessible across a multiple call centers according to the authenticated identifier.

According to yet another aspect of the present invention, a call is received from a caller, wherein an identity of the caller is authenticated. The call is placed in a hold queue. A caller profile associated with the identity of the caller is received from the caller profile server. Then, services provided to the caller while on hold may be specified according to the caller profile. In addition, a current position of the call in the hold queue may be adjusted according to a previous hold history for the caller specified in the caller profile, such that previous time spent holding by said caller is given value.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 illustrates a representative portion of a caller profile database within a caller profile server is provided in accordance with the method, system, and program of the present invention;

FIG. 6 depicts an illustration of a shift in the position of a call in a hold queue according to on hold points in accordance with the method, system, and program of the present invention;

DETAILED DESCRIPTION OF THE PREFERRED EMBODIMENT

A method, system, and program for managing caller profiles for multiple callers across multiple call hold queues are provided. For purposes of the present invention, a caller profile is identified by a subscriber voice identifier (VID) and includes, but is not limited to, personal information about a subscriber, products and services purchased by a subscriber, information service preferences of a subscriber, competition services of a subscriber, survey preferences of a subscriber, and activity performed by a subscriber while on hold across multiple call centers. In addition, a caller profile includes tracking of the current hold times and points granted for a particular call according to current hold times. According to the present invention, it is advantageous that a caller profile be tailored to information that aids specification of on hold activities, however a caller profile may incorporate information utilized for multiple purposes, in addition to specification of on hold activities.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of telephone systems, computing systems, and electronic devices under a number of different operating systems. In one embodiment of the present invention, the on hold call queue system is a computer system that incorporates communication features that provide telephony, messaging, and information services to a plurality of callers. In general, the present invention is preferably executed in a computer system that performs computing tasks such as manipulating data in storage that is accessible to the computer system.

Figure 1:
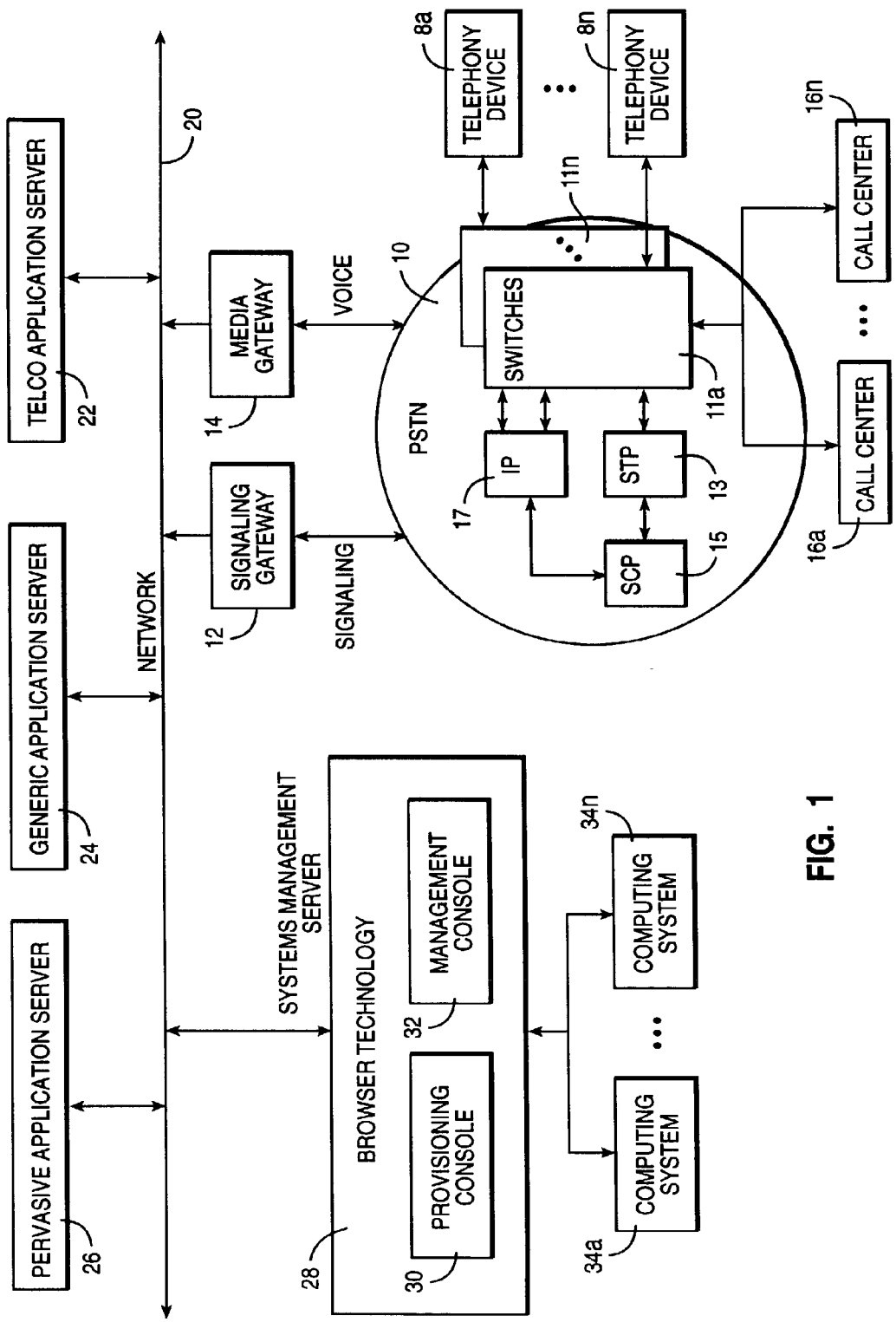
FIG. 1 illustrates a block diagram of a telecommunications network in which the present invention may be implemented.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information from one service provider to the next without security features.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via network 20 is totally untrusted and therefore may require authentication and additional security.

In the present invention, network 20 may comprise a private network, Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Further, as will be described, a subscriber profile is preferably updated in a caller profile server accessible to call centers 16a–16n. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other biometric information. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

PSTN Identity Authentication and Call Control

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP initiates an announcement to a caller to identify themselves to the subscriber with the privacy service who is being called. According to an advantage of the invention, authentication of the subscriber receiving the call may be required before the privacy service is initiated for that subscriber.

In particular, network traffic between signaling points may be routed via a packet switch called a service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other biometric methods.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, caller and callees are provided with services and billed for those services independent of the devices utilized. In particular, a 1129 protocol or other protocol may be utilized to enable signal communications between IP 17 and SCPs 15. In addition, as previously described, caller authentication to determine VIDs and RVIDs may be performed by a third party, such as telco application server 22.

An origin telephony device or destination telephony device may also determine a VID and/or RVID for the caller and/or callee of a call. In particular, telephony devices 8a–8n and call centers 16a–16n may function as origin and designation telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a line subscriber sells a house and a new line subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, when a central office switch detects an off-hook condition on a line, the central office switch will then determine if a VID signal is transferred from the off-hook telephony device. If a VID is transferred, then a query is made to SCP 15 according to the VID for any services specified for the authenticated caller. Alternatively, a query may be transferred via network 20 to an external server, such as system management server 28, to determine the services specified for the caller. The central office switch will then receive the dialed digits from the off-hook line terminal and route the call, providing services according to those preferred by the authenticated subscriber.

Alternatively, if a VID signal is not transferred from the off-hook telephony device, then the central office switch will provide a dial tone and transfer the call to an IP that prompts the caller to provide a voice entry or other identification. Alternatively, the central office switch may transfer the call to telco application server 22 for use of the caller authentication service. In either case, the identity for the caller is preferably authenticated, the call is transferred back to the central office switch, services are provided according to the VID authenticated for the caller, and the call is routed according to dialed digits from the off-hook line terminal.

In addition, an RVID may be provided in the present invention to authenticate the identity of a callee receiving the call. When a call is answered, the call is transferred back to an IP or telco application server 22 to authenticate the identity of the callee answering the call.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matches the voiced name. The matching person's digits are then utilized to route the call.

Call Center Environment

Figure 2:
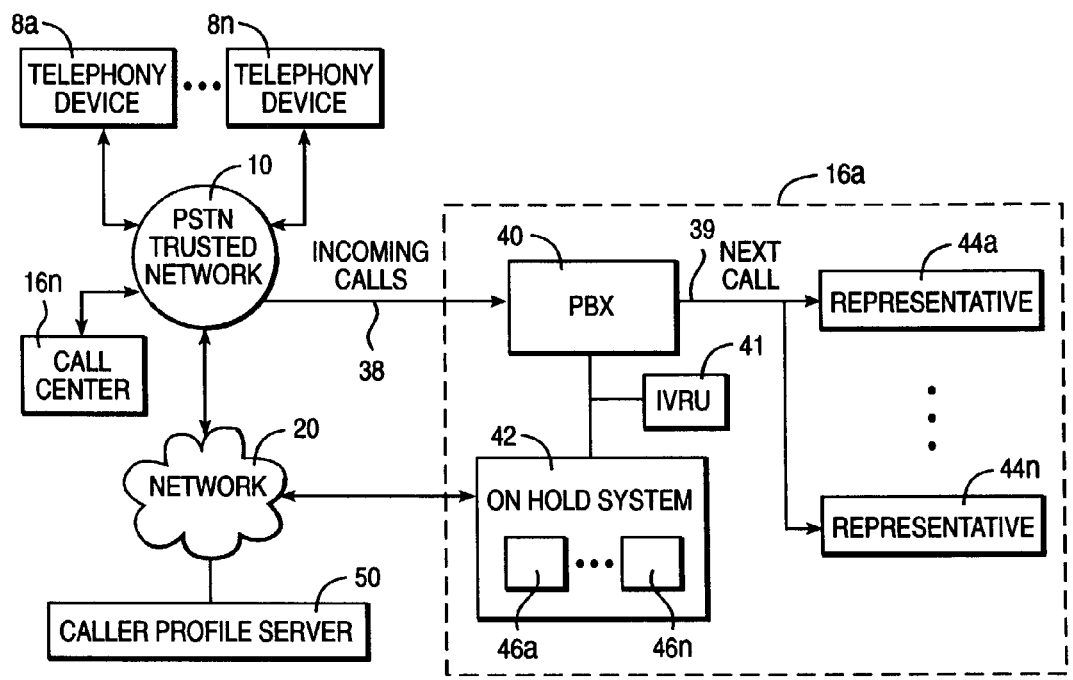
FIG. 2 depicts a block diagram of a network call center system in which the present invention may be implemented.

Referring now to FIG. 2, there is an illustrative network call center environment in which the present invention may be implemented. It will be appreciated by one with skill in the art that although a particular call center environment is described below, the invention is not limited to use within the described network environment, rather, the inventive queue position advancement process may be implemented within any on-hold information service regardless of the telephony environment.

As illustrated, multiple incoming calls are received at a call center 16*a*. In particular, a connection 38 includes a voice trunk and a signal link, such that both voice and VID signals may be received at PXB 40 from PSTN 10. Connection 38 is preferably connected to PSTN 10 via a wireline, wireless, Internet Protocol network, or other connection. PBX 40 distributes incoming calls to multiple representative terminals 44*a*–44*n* via connection 39, wherein connection 39 also includes a voice trunk and a signal link. In particular, PBX systems, and in particular PBX systems with automatic call distribution (ACD) ability, are well known in the art as switching systems designed to received telephone calls destined for call center 16*a* and to queue those call when a call handling agent is not available.

In the description which follows, it will be assumed that all representative terminals 44*a*–44*n* are busy and therefore PBX 40 cannot respond to an incoming call by making a direct connection to one of representative terminals 44*a*–44*n*. As a result, PBX 40 is forced to place the incoming call on hold. However, an advantage of the present invention is that when a call is transferred to one of representative terminals 44*a*–44*n*, the VID for the call is also transferred, enabling a representative to receive an authenticated identity of a caller, rather than just the line number from which a call is placed and the name of the subscriber of that line number. Additional authentication may be required by PBX 40 where callers are accessing sensitive information from representatives.

After placing the incoming call on hold, the VID, time of call, and other information received by PBX 40 are forwarded to on hold system 42. On hold system 42 preferably creates a record based on the call and positions the call within one of call queues 46*a*–46*n*. In particular, the call queue selected for a call is specified by a caller indication of the subject matter of a call. In addition, a single call queue may be utilized to store all calls on hold.

While in the present embodiment PBX 40 forwards calls to a single on hold system, in alternate embodiments, PBX 40 may forward calls to multiple on hold systems and to multiple call centers. In addition, on hold system 42 and other on hold systems may be coupled to PBX 40 or may be remotely accessed by PBX 40. Further, while in the present embodiment on hold system 42 is depicted as an independent system, on hold system 42 may also be incorporated within PBX 40.

While the call is on hold, an interactive voice response unit (IVRU) 41, coupled to PBX 40 and on hold system 42, may offer the caller a menu of available options for receiving call hold queue information for on hold system 42. In general, IVRU 41 is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within on hold system 42. For purposes of the present invention, prompts to the caller may be in voice, text, video, and/or graphical formats depending on the interface receiving the prompt. In addition to or as an alternative to IVRU 41, a voice browser may be utilized interact with a caller according to voice XML scripted pages.

According to one advantage of the present invention, a caller profile for the VID may be accessed by on hold system 42 from a caller profile server 50. On hold system 42 may then utilize the caller profile to specify the menu of available options and other services provided to the caller while the caller is on hold. In particular, a caller profile may include hold points or previous hold times calculated for a caller. On hold system 42 may utilize the hold points to determine whether a caller should be adjusted in position within a call hold queue.

Caller profile server 50 preferably includes profiles for multiple callers stored according to VIDs that are accessible across multiple call centers 16*a*–16*n*. Caller profile server 50 may be located within the extended network of PSTN 10 as a database that is preferably shared across multiple service providers accessible via an Intranet. Alternatively, as depicted, caller profile server 50 may be located in the external network of PSTN 10, where the external network is available via network 20.

As illustrated, on hold system 42 accesses caller profile server 50 via network 20. Advantageously, by storing caller profiles in caller profile server 50 according to VID, only a single identifier is needed to access a caller profile and only a single location is provided for access to a caller profile. Further, advantageously, a caller is only required to enter preferences and other information in one location, for storage according to VID, where the information is then accessible to multiple diverse call centers and other systems. As an additional advantage, different portions of a caller profile may be stored in different server system locations, but each referenced for a single caller according to that caller's VID.

In addition to requesting caller profiles, on hold system 42 may transmit caller on hold activity to caller profile server 50 according to a caller VID. On hold activity may include the options selected by a caller while on hold, the times a caller waited in call hold queues, and the time that a caller spent with a representative, for example.

According to another advantage of the present invention, a VID may be authenticated by on hold system 42 and transmitted with requests for caller profiles and logging of caller on hold activity. In particular, call center 16a may provide authentication of the identity for on hold system 42 in a VID. Alternatively, PSTN 10 or telco application server 22 may authenticate the identity of on hold system 42. Moreover, caller profile server 50 may authenticate the identity on hold system 42. In this case, authentication may be performed with a password sequence, security protocol, biometric input, encryption, or other secure format.

By requiring an on hold system to authenticate transmissions, caller profile server 50 may ensure that only those on hold systems that have subscribed to the service or are verifiable on hold systems, will receive caller profiles. In addition, a VID of an on hold system may by utilized to specify the types of information within a caller profile that are provided to a particular on hold system.

According to further advantage of the present invention, a caller profile may be initiated and adjusted while on hold and off hold. In particular, a profile for a caller may be initiated and added to from any subscribing call center while a caller is on hold. In addition, a profile for a caller may be initiated and adjusted by the caller via a web site interface to caller profile server 24 off-line. In particular, such an interface may be provided by systems management server 28, as described in FIG. 1.

Figure 3:
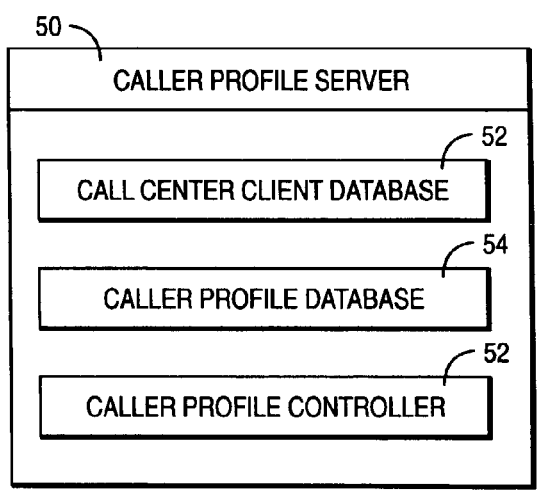
FIG. 3 illustrates a block diagram of a caller profile server in accordance with the method, system, and program of the present invention.

Referring now to FIG. 3, there is an illustrative block diagram of a caller profile server in accordance with the method, system, and program of the present invention. As depicted, a caller profile server 50 includes a caller profile controller 56 for controlling the functions of caller profile server 50. In particular, caller profile controller 56 may include at least one processor, memory, data storage, system software, and application software that function together.

Caller profile server 50 also includes a call center client database 52. Advantageously, call centers may be required to subscribe to use of call profile server 50. In subscribing to use of call profile server 50, a call center may specify the types of information from a caller profile that are transmitted in response to a request from that call center for a caller profile. Preferably, registered call centers may be stored in call center client database 52 according to call center or on hold system VID. Further, registered call centers may be required to sign a privacy statement that is filed with the call center identifier, to ensure that personal caller information is only utilized privately by the registered call centers.

In addition, caller profile server 50 includes a caller profile database 54. Caller profile database 27 preferably includes multiple caller profiles stored for multiple callers, where each caller is identifiable by a VID. Caller profiles may include personal information, service preferences, product and service purchase records, previous hold activities, current wait history, and other information that is provided by a caller or monitored by a call center and transferred to call profile server 24. In addition, a caller profile may include preferences for types of token advancement systems and records of extra tokens earned by the caller for redemption in future calls. Further, a caller profile may include preferences for the interface and format of publication of hold queue information.

In particular, in the present invention, the current wait history for a caller may be further specified according to the hold times of a caller across multiple hold queues, where those hold queues may be within a single on hold system, multiple on hold systems, and multiple call centers. Caller profile controller 56 may calculate on hold points that are representative of current hold times dependent upon factors including, but not limited to, the support policy of a call center, the caller's standing, previous problem history, and a reason for transferring between hold queues. A formula, such as Apoints+'minutes*rate@ may be implemented to calculate the on hold points, where the rate is determined by the above factors.

Figure 4:
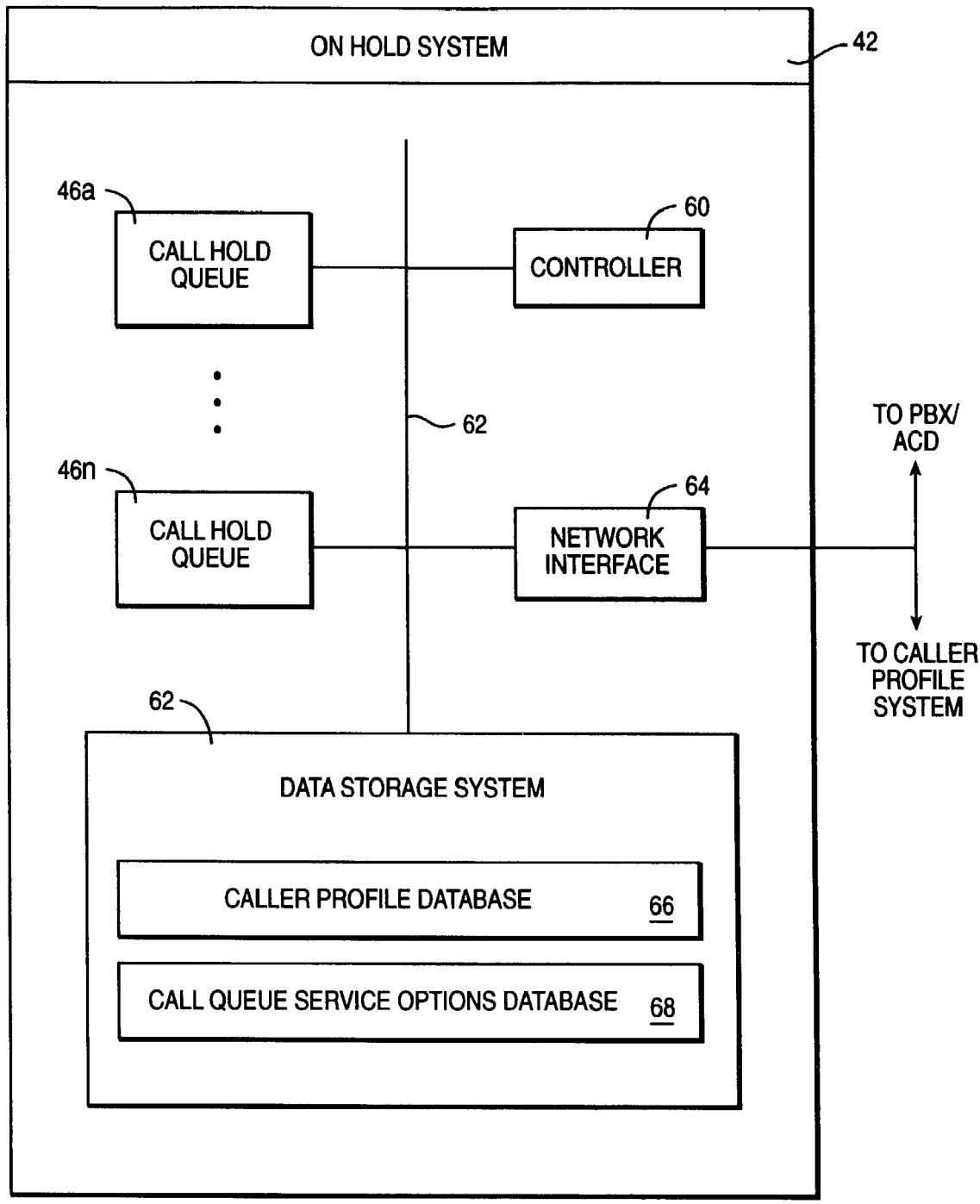
FIG. 4 depicts a block diagram of an on hold system in accordance with the method, system, and program of the present invention.

With reference now to FIG. 4, there is an illustrative block diagram of an on hold system in accordance with the method, system, and program of the present invention. As illustrated, on hold system 42 includes a controller 50, call hold queues 46a–46n, a network interface 64, and a data storage system 62 communicatively connected via a bus 63. Additional systems may be connected along bus 63 that are not depicted herein. In particular, controller 60 comprises conventional computer resources including, but are not limited to, at least one processor, memory, a data storage system, system software and application software, that function together to perform the functions described with reference to controller 60.

Network interface 64 preferably communicates with PBX 10 via a telephone network or other networking system. In addition, network interface 64 may communicate with network 20 in order to access caller profile server 50. In particular, network interface 34 receives transfers of calls from PBX 40 and then returns calls to PBX 40 when a call is the next in line within one of call hold queues 46a–46n.

In the present invention, while a call is holding within one of call hold queues 46a–46n, the caller is preferably prompted by IVRU 41 to select from the multiple available service options designated in call queue service options database 68. However, according to an advantage of the present invention, the service options are first filtered according to the caller profile associated with the VID of the caller, such that the caller is only presented with those options that are specifically designated by the caller and those options which are tailored to the caller according to the caller profile.

A caller profile may be stored locally to on hold system 42 according to VID in caller profile database 66. In addition, according to an advantage of the present invention, a caller profile may be accessed remotely according to VID from caller profile server 50.

Caller profiles returned from caller profile server 50 may be stored in caller profile database 66 to supplement or start a caller profile for a particular VID. In particular, it may be advantageous for on hold system 42 to manage a local caller profile for each VID, in addition to accessing the caller profile from caller profile server 50, where the caller profile includes purchases made by the caller and other information that the caller has specifically disclosed to the on hold system in privacy. In addition, a local caller profile stored in caller profile database 66 advantageously includes a record of current wait history specifically within on hold system 42, where points are tabulated when callers wait in hold queues.

After a caller selects a service option, the activity of the caller, while on hold, is preferably monitored by on hold system 42. In particular, the on hold system may monitor the types of music, news or other audio information listened to, the competitions participated in, the third-parties accessed, and other activities that a caller may participate in while on hold. The monitored activity may be added to the local caller profile according to VID in caller profile database 66. In addition, according to an advantage of the present invention, the monitored activity is transmitted according to VID to caller profile server 50. Where the call is transferred to a third-party system that performs the selected service option, that third-party system may monitor activity and notify on hold system 42 and caller profile server 50 of the monitored activity. For example, a third-party system may provide a competition service.

In addition, after a caller selects a service option, the service is specified according to a caller profile accessible according to VID. By sharing on hold activity across multiple call centers, each call center may avoid repetition of services, unless such repetition is preferred by a caller. For example, where a caller selects a music service, the music service is specified not to play songs that the caller has already listened to within a particular period of time while on hold as indicated within the caller profile according to VID. In addition, the caller profile may indicate specific songs that the caller prefers to hear.

When a call is initially received into PBX 40 or on hold system 42, where multiple call queues are utilized, the caller may be prompted by IVRU 41 to select from a menu of subject matters of the call. Depending on the subject matter selected, a related one of call hold queues 46a–46n is utilized to hold the call.

However, within the cycle of a single call, that call may be placed in a single queue multiple times or multiple queues. In a first case, a caller may inadvertently select the wrong subject by entering a keypad entry or voice entry that is different than the one intended. According to a second case, a caller may not be able to discern which menu subject relates to the caller's subject and therefore may not choose the necessary subject. According to a third case, a caller may need to speak with multiple representatives about multiple subjects in a single call. Other cases where a caller may be placed in a single queue multiple times or multiple queues are also relevant.

According to an advantage of the present invention, a caller profile stored locally or remotely according to VID may include the current call hold history of a caller. Where a call is transferred from one call hold queue to another call hold queue, the call is preferably adjusted in position within the queue according wait times that have already occurred during the call. Thus, if a caller has already waited forty minutes in a first queue only to find out that the caller selected the wrong queue, then some portion of the first hold time is utilized to adjust the position of the caller in the second queue, such that the caller does not lose all the time originally waited when positioned in the second queue.

In particular, the caller profile according to VID is utilized to calculate on hold points utilized to determine the adjustment position within a queue. Different systems may provide different amounts of adjustment depending on the reason for holding or transferring. For example, a caller who has waited in the wrong queue may not be given as many points for minutes previously on hold as a caller is given who has waited for a first representative and an additional representative is required to fully answer a question.

In particular, controller 60 may calculate on hold points that are representative of current hold times dependent upon factors including, but not limited to, the support policy of a call center, the caller's standing, previous problem history, and a reason for transferring between hold queues. A formula, such as Apoints+'minutes*rate@ may be implemented to calculate the on hold points, where the rate is determined by the above factors. Further, on hold points may be calculated locally by controller 60, calculated remotely at a caller profile server, and/or the points may be combined.

With reference now to FIG. 5, an illustrative portion of a caller profile database within a caller profile server is provided in accordance with the method, system, and program of the present invention. As depicted, caller profiles 70 include two caller profiles stored according to VID. Information compiled in caller profiles 70 may be accessed from a single or multiple locations for each of the VIDs. For example, one caller profile may be stored at a first caller profile server and a second caller profile stored locally. In another example, the on hold music preferences according to each VID may be accessed from a first third party server while the personal information according to each VID is accessed from a second third party server.

In the examples, the identity of a caller, or the VID, is specified by the name of the caller and a number to further specify the name. In one example, the number may represent an additional identifier, such as a social security number or other government identification number.

First, preferences for each caller are specified, in the present example, according to music, news, and games. Advantageously, by specifying on hold preferences in a caller profile that is accessible across multiple hold centers according to a single identifier, each hold center may automatically specify music output to the caller according to the preferences specified. In alternate embodiments, alternate types of preferences may be specified. In addition, while in the present embodiment generic preferences are specified, in alternate embodiments, more specific preferences, such as weather in a particular zip code, a particular song, a particular game, and other such specifications, may be made.

Next, personal information for each caller is specified. In the example, personal information includes the sex, age, education, occupation, and typical geographic region of the caller. Personal information may be utilized by an on hold system to tailor the services provided to a caller. For example, instead of just offering a current weather service, a current weather service for the caller's geographical region may be offered. Further, advertising played to the caller may be better targeted according to the age, sex, occupation, education, and special needs of a caller.

Further, products and services purchased by a caller are specified. For example, the computer, appliance or cable service utilized by a caller may be recorded. The caller may specify products and services for a caller profile or companies may share product and service information in caller profiles.

In addition, a monthly wait history preferably indicates the activity of a caller according to time, service, and specific activity within the service. For example, caller ID A5124440000@ spent thirty minutes on hold listening to classical music. In particular, songs A–G were played, where the titles or reference numbers of songs A–G are provided. In addition, the call system ID may be included with each entry of a monthly wait history.

Moreover, a current wait history for each call is included in a caller profile. The amount of time, the queue in which a caller waits and the reason for transferring to another queue are recorded in a caller profile. In addition, on hold points may be calculated for a caller based on the number of minutes on hold and the reason for transferring. Alternatively, each on hold system may calculate on hold points based on number of minutes on hold and the reason for transferring.

Each on hold system may adjust the position of a call in a queue that the call has been transferred to according to the on hold points from a caller profile for the call. Therefore, a caller does not lose the time already on hold when transferring to another call hold queue is required.

Moreover, a monthly time spent per representative may be include in a caller profile. The monthly time spent per representative may be utilized to better estimate a caller's time left in the queue. In particular, even after a call transfers from an on hold system to a representative terminal, the caller activity is monitored.

Referring now to FIG. 6, there is an illustrative embodiment of a shift in the position of a call in a hold queue according to on hold points in accordance with the method, system, and program of the present invention. In the examples following, the progress of a caller VID A512-33-000@ (hereafter referred to as A512@) is tracked through multiple hold queues A#1@ and A#2@ where on hold points are utilized to adjust the position of the call within hold queue #2.

As depicted, hold queue information 72 include queue information for hold queue #1. The A512@ call has been on hold for sixty minutes within hold queue #1 before a representative is able to answer the call. The caller has been connected with a representative for two minutes.

In the example, the A512@ call is transferred to a new call queue, here hold queue #2. In particular the call is transferred because hold queue #1 does not access representatives that can meet the needs of the caller.

Hold queue points may be calculated for the call according to the amount of time the caller was on hold in hold queue #1. In the example, a rate of A.5@ is utilized for the call. The rate may be determined from multiple factors or may be assigned by the representative transferring the call. Here, the rate is determined from the factor that the caller chose the wrong subject and therefore was placed in the wrong queue.

When the A512@ call is initially transferred to hold queue #2, the call is received in the last position currently available in hold queue #2 as illustrated at reference numeral 75 of hold queue information 74. However, the on hold points for the call that are stored in the caller profile are preferably applied to the caller's position within hold queue #2.

Hold queue information 76 depicts the position of calls within hold queue #2 after the on hold points are applied for the A512@ call. In particular, in this example, thirty on hold points allow the caller to jump in position ahead of any callers who have waited less than thirty minutes. In alternate examples, the value of on hold points may translate into other amounts of adjustment of position within a hold queue.

In particular, on hold points that are not utilized by the end of a call are preferably stored with a caller profile according to a VID. If a particular caller calls the call center and is placed on hold within a particular period of time after the first call, then the on hold points may apply to the caller's position within the call queue. In another example, call centers may share on hold point information with the caller profile server such that one call center can adjust a caller's position within a hold queue if that caller has already been on hold in a separate call for a lengthy period of time at another call center. In either example, showing the caller that there is value associated with waiting will alleviate caller frustrations, particularly where the caller is spending a large portion of time each day waiting on hold.

Figure 7:
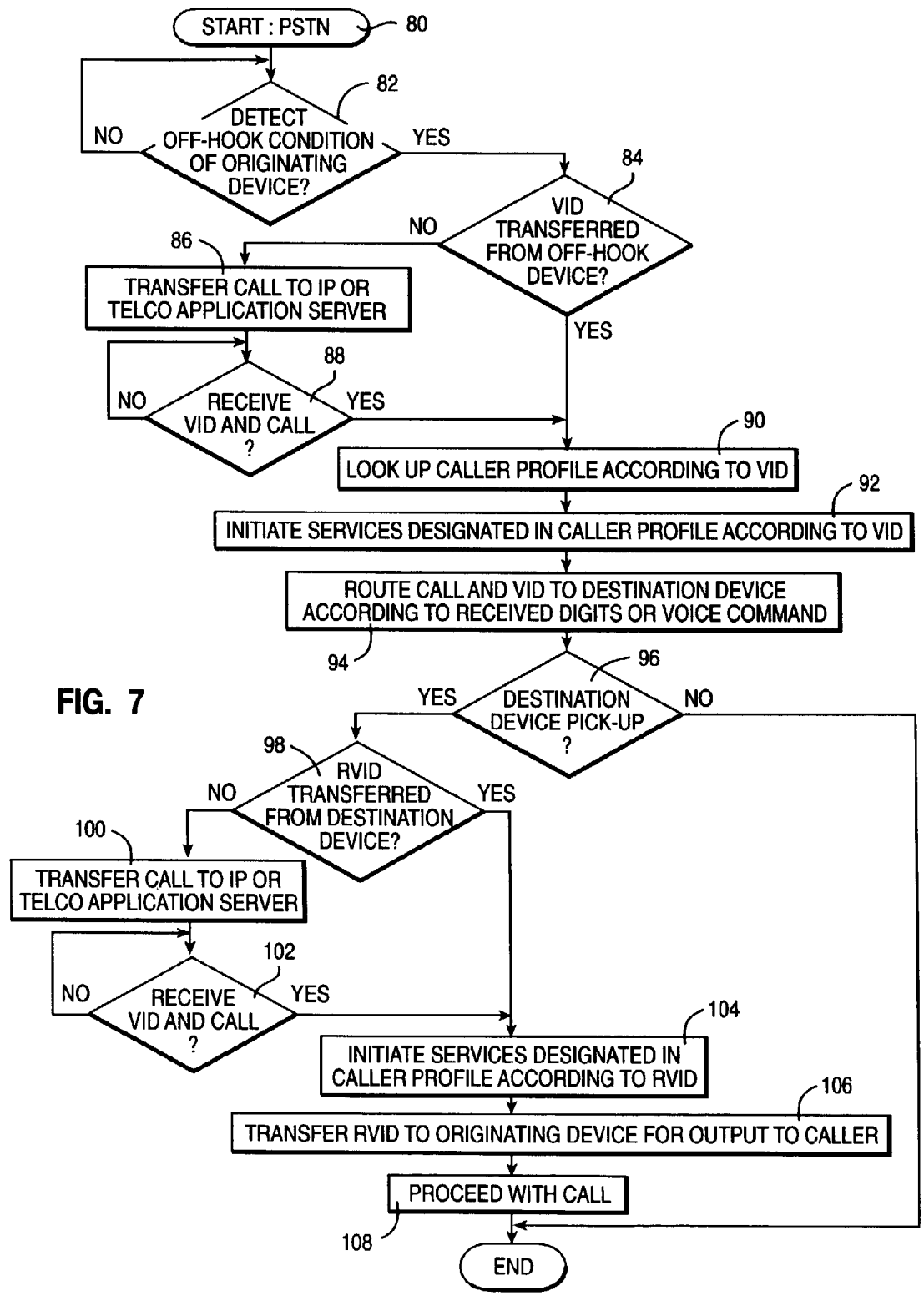
FIG. 7 illustrates a high level logic flowchart of a process and program for controlling a switching network in accordance with the method, system, and program of the present invention.

With reference now to FIG. 7, there is depicted a high level logic flowchart of a process and program for controlling a switching network in accordance with the method, system, and program of the present invention. As illustrated, the process starts at block 80 and thereafter proceeds to block 82.

Block 82 illustrates a determination as to whether an off-hook condition is detected in association with an originating telephony device. If an off-hook condition is not detected, then the process iterates at block 82. If an off-hook condition is detected, then the process passes to block 84.

Block 84 depicts a determination as to whether a VID is transferred from the off-hook device. The originating telephony device may authenticate an identity for a caller. However, the PSTN or other servers connected thereto may require additional authentication within a trusted network for access to certain types of services. If a VID is received and no additional authentication is required, then the process passes to block 90. If a VID is not received or if the PSTN requires additional authentication, then the process passes to block 86. Block 86 illustrates transferring the call to an intelligent peripheral or a telco application server for authentication. Block 88 depicts a determination as to whether the VID and the call are returned to the switching center. If not, then the process iterates at block 88. If the VID and the call are returned, then the process passes to block 90.

Block 90 depicts looking up the caller profile according to VID. The caller profile may be stored in a database within the PSTN, in an extended network to the PSTN or in a network external to the PSTN. Next, block 92 illustrates initiating services designated in the caller profile retrieved according to the VID. Thereafter, block 94 depicts routing the call and the VID to a destination device according to received digits or a voice command, and the process passes to block 96.

Block 96 illustrates a determination as to whether the destination device is detected with a pick-up (off-hook) condition. If the destination device does not pick-up, then the process ends. If the destination device does pick-up, then the process passes to block 98.

Block 98 depicts a determination as to whether an RVID is transferred from the destination device. If the RVID is transferred, then the process passes to block 104. If not, then the process passes to block 100. Block 100 illustrates transferring the call to an intelligent peripheral or telco application server. Next, block 102 depicts a determination as to whether an RVID and call are received back at the switching center. If not, then the process iterates at block 102. When the RVID and call are received, then the process passes to block 104.

Block 104 illustrates initiating services designation in a caller profile associated with the RVID. Next, block 106 depicts transferring the RVID to the originating device for output to the caller. Thereafter, block 108 illustrates proceeding with the call, where additional services are applied when applicable, and the process ends.

Figure 8:
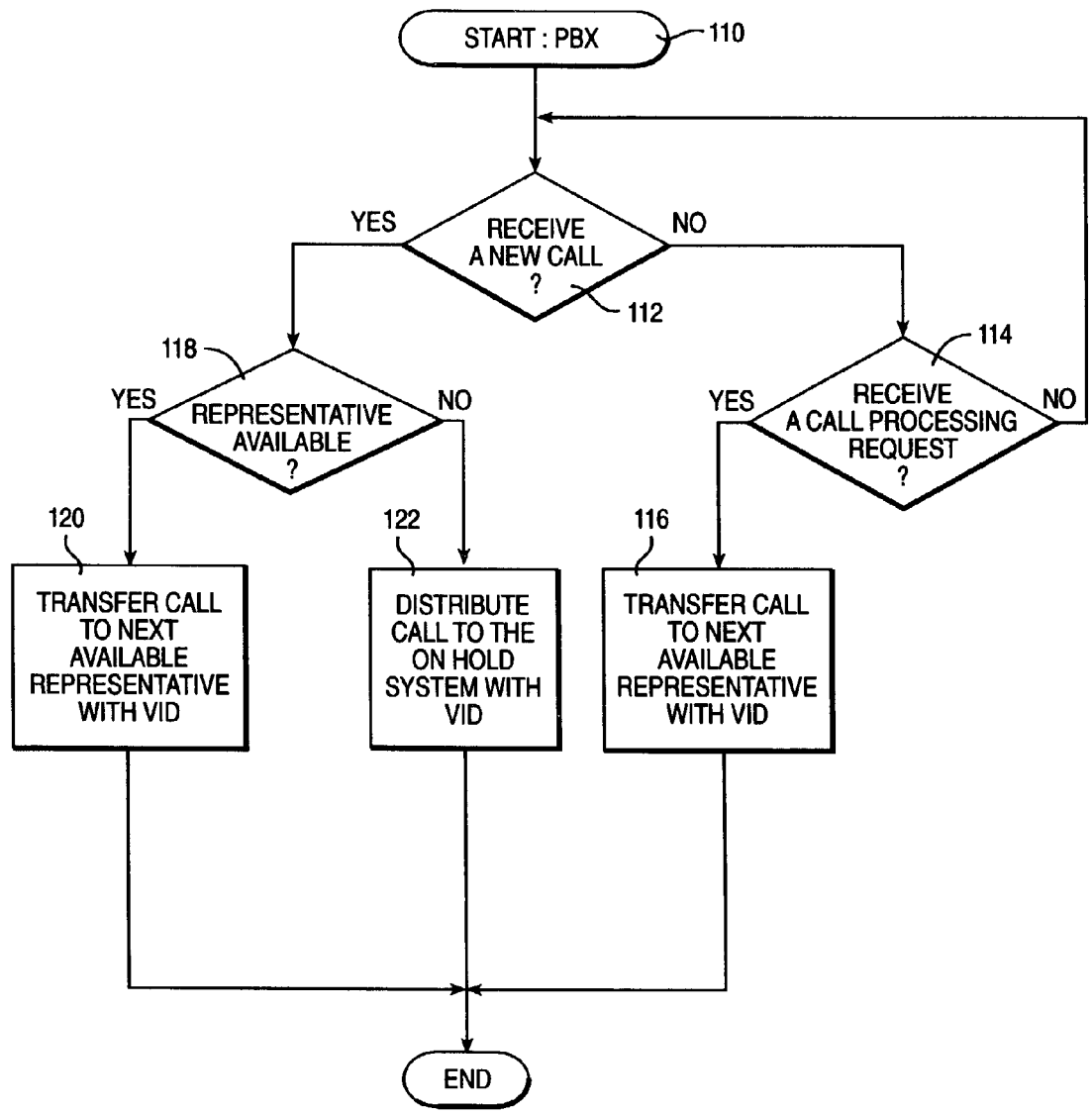
FIG. 8 depicts a high level logic flowchart of a process and program for controlling a PBX system within a call center in accordance with the method, system, and program of the present invention.

With reference now to FIG. 8, there is depicted a high level logic flowchart of a process and program for controlling a PBX system within a call center in accordance with the method, system, and program of the present invention. As illustrated, the process starts at block 110 and thereafter proceeds to block 112.

Block 112 depicts a determination as to whether a new call is received. If a new call is received, then the process passes to block 118. If a new call is not received, then the process passes to block 114. Block 114 illustrates a determination as to whether or not a call processing request is received. When a call is at the top of the call queue, the call is preferably transferred back to the PBX with a call processing request. If a call processing request is not received, then the process passes to block 112. If a call process request is received, then the call is transferred to the next available representative with a VID, as depicted at block 116, and the process ends.

Block 118 illustrates a determination as to whether or not a representative is available. If a representative is available, then the call is transferred to the next available representative with a VID, as illustrated at block 120, and the process ends. If a representative is not available, then the process passes to block 122. Block 122 illustrates distributing the call to the on hold system with the VID, and the process ends.

Figure 9:
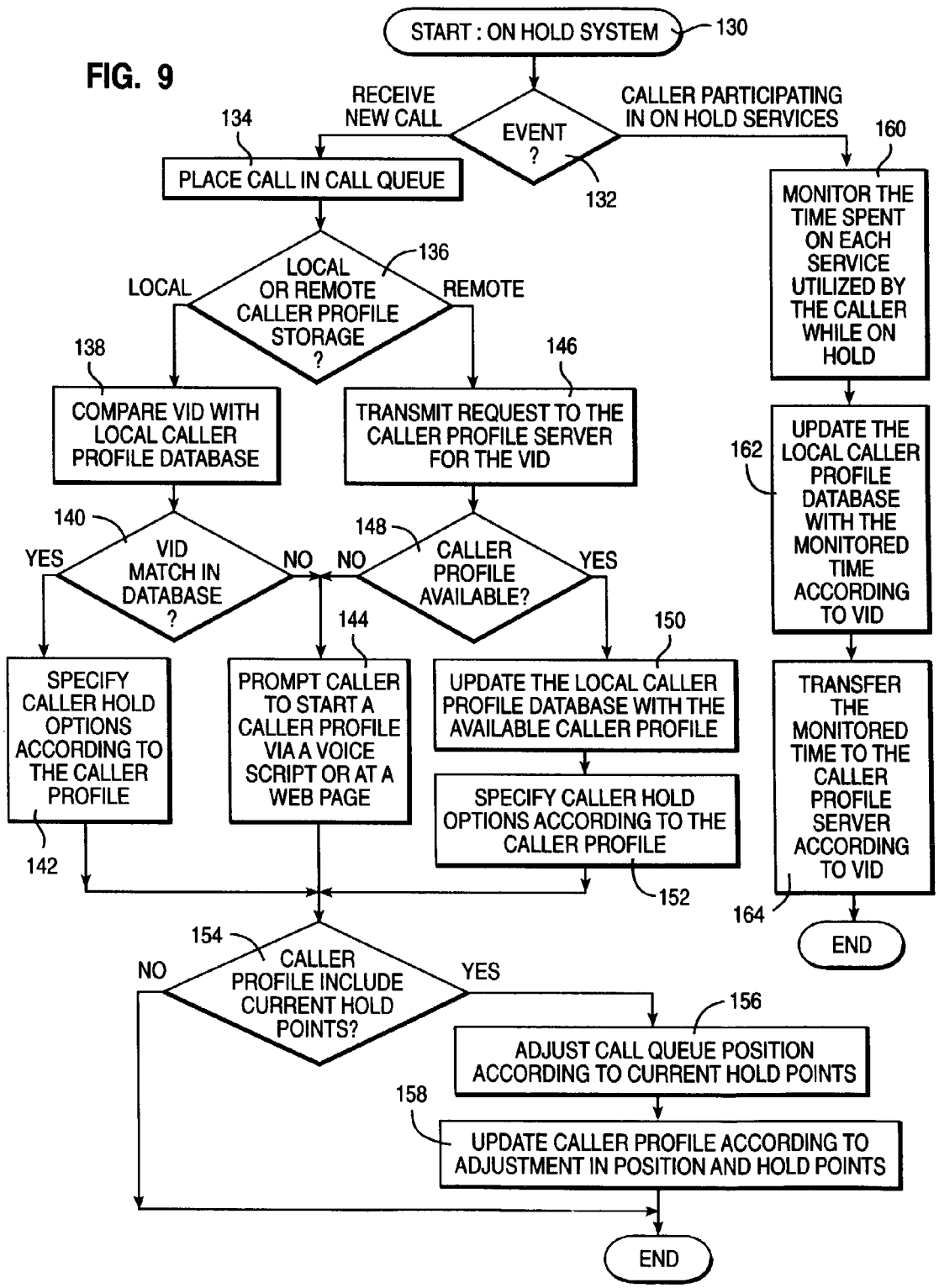
FIG. 9 illustrates a high level logic flowchart of a process and program for controlling an on hold system in accordance with the method, system, and program of the present invention.

Referring now to FIG. 9, there is illustrated a high level logic flowchart of a process and program for controlling an on hold system in accordance with the method, system, and program of the present invention. As depicted, the process starts at block 130 and thereafter proceeds to block 132.

Block 132 illustrates a determination as to the type of event that occurred when an event occurs. If a new call is received, then the process passes to block 134. If a caller participates in on hold services, then the process passes to block 160.

Block 134 depicts placing the call in a call queue. Next, block 136 illustrates a determination as to whether local and/or remote caller profile storage is utilized. Both local and remote caller profile storage maybe utilized concurrently. If local caller profile storage is utilized, then the process passes to block 138. If remote caller profile storage is utilized, then the process passes to block 146.

Block 138 illustrates comparing the VID of the call with the local caller profile database. Next, block 140 depicts a determination of whether a VID matches with a VID for a caller profile in the local caller profile database.

If a VID does not match, then the caller is prompted to start a caller profile via a voice script or at a web page, as illustrated at block 144, and the process passes to block 154. In particular, regardless of whether a caller starts a profile, profile building for a VID may begin for the current call.

If a VID does match, then the process passes to block 142. Block 142 depicts specifying the caller hold options according to the caller profile, and the process passes to block 154.

Block 146 depicts transmitting the request to the caller profile service for a caller profile according to the VID. Next, block 148 illustrates a determination as to whether or not a caller profile is available from the caller profile server for the VID. If a caller profile is not available, then the process passes to block 144. If a caller profile is available, then the process passes to block 150.

Block 150 illustrates updating the local caller profile database with the available caller profile for the VID. Next, block 152 depicts specifying the caller hold options according to the caller profile, and the process passes to block 154.

Block 154 depicts a determination as to whether a caller profile includes current hold points or multiple holds during the current call. If a caller profile does not include current hold points or multiple holds during the current call, then the process ends. If a caller profile does include current hold points or multiple holds during the current call, then the process passes to block 156. Block 156 illustrates adjusting the call queue position of the call according to the current hold points or multiple holds during the current call. Each on hold system may make a particular number of adjustments in position of a caller dependent upon the on hold systems needs. Next, block 158 depicts updating the caller profile according to the adjustment in position and hold point usage, and the process ends.

In response to detecting a caller participating in on hold services, block 160 depicts monitoring the time spent on each service utilized by the caller while on hold. Next, block 162 illustrates updating the local caller profile database with the monitored times according to VID. Thereafter, block 164 depicts transferring the monitored times to the caller profile service according to the VID, and the process ends.

Figure 10:
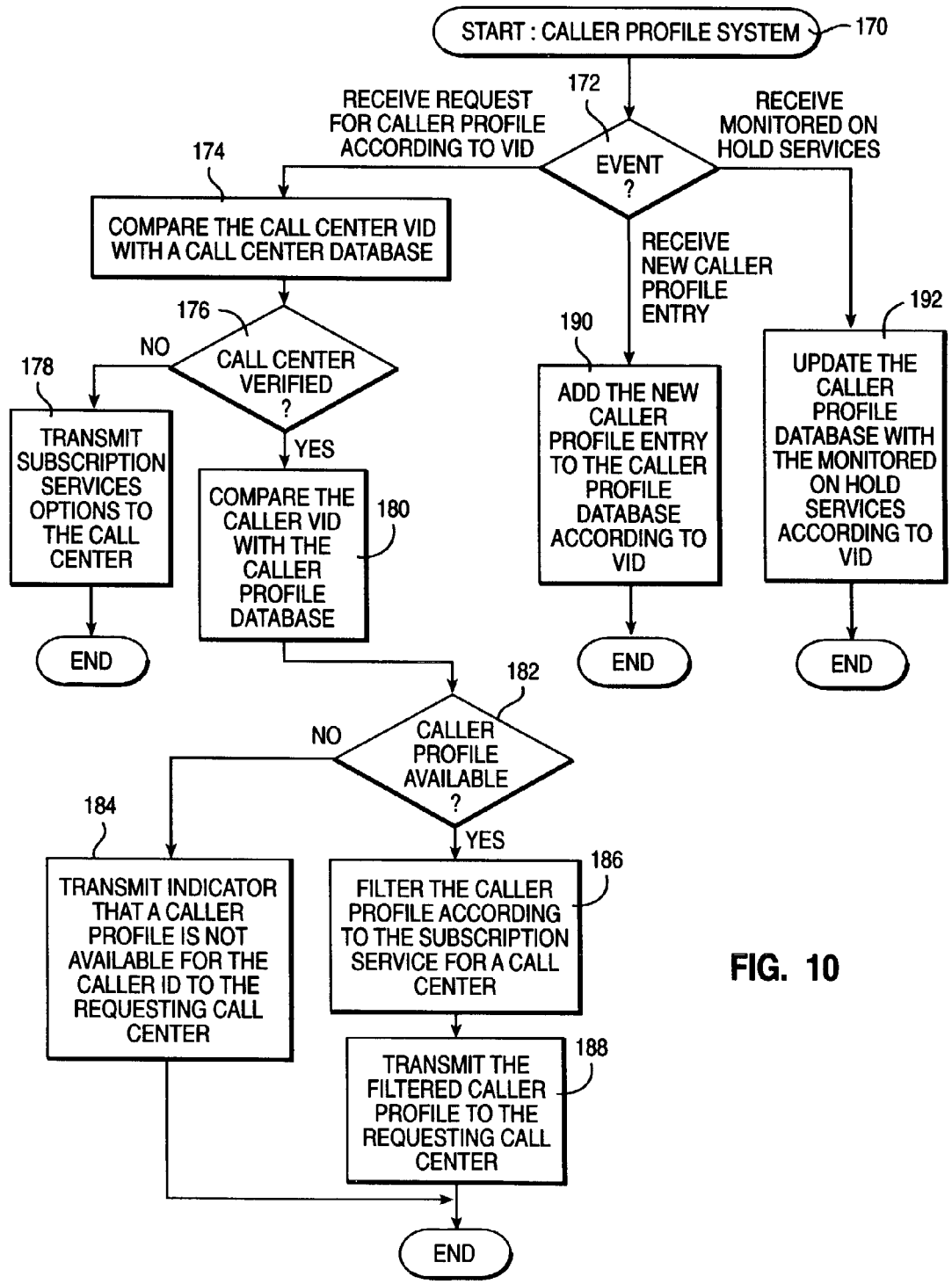
FIG. 10 depicts a high level logic flowchart of a process and program for controlling a caller profile server in accordance with the method, system, and program of the present invention.

With reference now to FIG. 10, there is illustrated a high level logic flowchart of a process and program for controlling a caller profile server in accordance with the method, system, and program of the present invention. As depicted, the process starts at block 170 and thereafter proceeds to block 172.

Block 172 illustrates a determination as to the type of event that occurred when an event occurs. If a request for a caller profile according to caller ID is received, then the process passes to block 174. If a new caller profile entry is received, then the process passes to block 190. If monitored on hold service activity is received, then the process passes to block 192.

Block 174 depicts comparing the call center VID with the call center database. Next, block 176 illustrates a determination as to whether the call center is verified by the VID. If the call center is not verified, then a subscription services option is transmitted to the caller center, as depicted at block 178, and the process ends. If the call center is verified, then the process passes to block 180.

Block 180 illustrates comparing the caller VID with the caller profile database. Next, block 182 depicts a determination as to whether a caller profile is available for the caller VID. If a caller profile is not available for the caller VID, then an indicator is transmitted to the call center indicating that the caller profile is not available, as illustrated at block 184, and the process ends. If a caller profile is available, then the process passes to block 186.

Block 186 depicts filtering the caller profile according to the subscription service for the call center. Next, block 188 illustrates transmitting the filtered caller profile to the requesting call center, and the process ends.

In response to receiving a new caller profile entry, block 190 illustrates adding the new caller profile entry to the caller profile database according to a caller VID, and the process ends. In particular, a new caller profile may be received from a call center, received via a web page entry, or received via a voice entry.

In response to receiving monitored on hold service activity, block 192 depicts updating the caller profile database with the monitored on hold service activity according to caller VID. In particular, the monitored on hold service activity may include the monitored times, general services, and activity within the service.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for controlling distribution of caller profiles comprising:
   receiving a request at a central server system accessible from a telecommunications network for a caller profile according to an authenticated voice identifier of a caller currently on hold within a particular call center from among a plurality of call centers enabled to access said central server system;
   locating, at said central server system, said caller profile matching said authenticated voice identifier, wherein said caller profile comprises prior on hold selections by said caller while previously waiting on hold at at least one of said plurality of call centers, wherein said prior on hold selections were transferred to said central server system; and
   distributing said caller profile to said particular call center according to said authenticated voice identifier, such that said particular call center is enabled to customize on hold services provided to said caller according to said caller profile, wherein said caller profile is accessible across said plurality of call centers according to said voice identifier for customizing on hold services provided to said caller.

2. The method for controlling distribution of caller profiles according to claim 1, further comprising:
   receiving an alternate request at said central server system for said caller profile according to said authenticated voice identifier of said caller currently on hold within an alternate call center from among said plurality of call centers; and
   distributing said caller profile to said alternate call center according to said authenticated voice identifier.

3. The method for controlling distribution of caller profiles according to claim 1, further comprising:
   requiring an authentication of an identifier for said particular call center with said request before distributing said caller profile to said particular call center.

4. The method for controlling distribution of caller profiles according to claim 1, wherein said caller profile comprises at least one from among personal information, billing information, a selection of preferences while on hold, and previous product purchases.

5. The method for controlling distribution of caller profiles according to claim 1, wherein said authenticated voice identifier is authenticated by identifying and verifying a voice sample of said caller.

6. A system for controlling distribution of caller profiles, comprising:
   a caller profile server communicatively connected to a network accessible by a plurality of call centers;
   means for receiving a request at said caller profile server for a caller profile according to an authenticated voice identifier of a caller currently on hold within a particular call center from among said plurality of call centers;
   means for locating said caller profile matching said authenticated voice identifier at said caller profile server, wherein said caller profile comprises prior on hold selections by said caller while previously waiting on hold at at least one of said plurality of call centers, wherein said prior on hold selections were transferred to said central server system; and
   means for distributing said caller profile to said particular call center according to said authenticated voice identifier, wherein said caller profile is accessible across said plurality of call centers according to said voice identifier for customizing on hold services provided to said caller.

7. The system for controlling distribution of caller profiles according to claim 6, wherein said caller profile server is communicatively connected to a PSTN network via an intranet.

8. The system for controlling distribution of caller profiles according to claim 6, wherein said caller profile server is communicatively connected to an Internet Protocol network accessible to said call center and a PSTN network.

9. The system for controlling distribution of caller profiles according to claim 8, wherein said caller profile server is communicatively accessible to said PSTN network via a plurality of gateways, wherein said plurality of gateways switch both signaling and voice data.

10. The system for controlling distribution of caller profiles according to claim 6, wherein said caller profile server further comprises:
    means for further authentication of said authenticated voice identifier by said caller profile server prior to release of said caller profile to said call center.

11. The system for controlling distribution of caller profiles according to claim 6, wherein said authenticate voice identifier is authenticated by identifying and verifying a voice sample of said caller.

12. The system for controlling distribution of caller profiles according to claim 6, wherein said caller profile server further comprises:
    means for requiring an authentication of an identifier for said call center with said request before distributing said caller profile to said particular call center.

13. A method for controlling distribution of caller profiles to call centers, comprising:
    receiving a request at a central server system accessible from a telecommunications network for a caller profile according to an authenticated voice identifier of a caller currently on hold within a call center, wherein said request comprises an identifier for said call center;
    determining a subscription status of said call center from among a plurality of call center subscriptions according to said identifier for said call center; and
    only distributing a subscribed to portion of said caller profile to said call center according to said subscription status.

14. The method for controlling distribution of caller profiles according to claim 13, wherein said identifier for said call center is at least one from among an authenticated voice identifier, a subscription code identifier, and a line number identifier.

15. A system for controlling distribution of caller profiles to call centers, comprising:
- a caller profile server communicatively connected to a network accessible by a plurality of call centers;
- means for receiving a request at said caller profile server for a caller profile according to an authenticated voice identifier of a caller currently on hold within a call center, wherein said request comprises an identifier for said call center;
- means for determining a subscription status of said call center from among a plurality of call center subscriptions according to said identifier for said call center; and
- means for only distributing a subscribed to portion of said caller profile to said call center according to said subscription status.

16. The system for controlling distribution of caller profiles according to claim 15, wherein said identifier for said call center is at least one from among an authenticated voice identifier, a subscription code identifier, and a line number identifier.

* * * * *